Figure 1:
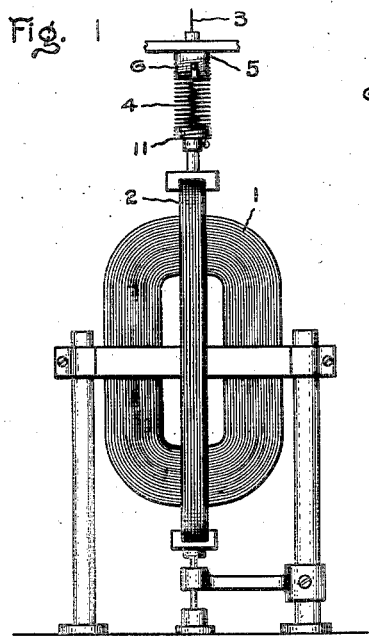

R. MILLER, Jr.
CONTROL SPRING.
APPLICATION FILED AUG. 28, 1909.

1,098,956.

Patented June 2, 1914.

WITNESSES:

INVENTOR
ROBERT MILLER, JR.
BY
ATT'Y.

UNITED STATES PATENT OFFICE.

ROBERT MILLER, JR., OF SCHENECTADY, NEW YORK, ASSIGNOR TO GENERAL ELECTRIC COMPANY, A CORPORATION OF NEW YORK.

CONTROL-SPRING.

1,098,956.     Specification of Letters Patent.     Patented June 2, 1914.

Application filed August 28, 1909. Serial No. 515,011.

*To all whom it may concern:*

Be it known that I, ROBERT MILLER, Jr., a citizen of the United States, residing at Schenectady, county of Schenectady, State of New York, have invented certain new and useful Improvements in a Control-Spring, of which the following is a specification.

My invention relates to control systems for the rotatable element of measuring instruments and similar devices and more particularly to control springs for use in connection with electrical measuring instruments such as dynamometers, in which it is essential that the spring be accurately centered with reference to the movable element and free from strains other than those due to the movement of the movable element to which the spring is connected.

In various types of instruments having a rotatable member moved against a control spring which has one end secured to the member and the other end secured to a support it is necessary that the spring be accurately centered about the axis of rotation of the rotatable member and it is often desirable, for the purpose of adjustment and calibration, to alter the length of the portion of the control spring which is free to yield in response to the relative movement of the support and the rotatable element. In the constructions commonly used great care and skill are required to position the spring accurately, and any adjustment for the purpose of altering the length of the spring is apt to change its shape and thereby alter its action to a sufficient extent to impair the accuracy of the instrument. In precision instruments such as dynamometers, it has been the custom to use a helical control spring with one end secured to the moving element of the dynamometer and the other end is bent after the spring is formed to provide a means of securing the spring to a trunnion or support mounted concentric with the moving element. Investigation has shown that the method of construction did not hold the spring accurately centered with reference to the moving element of the dynamometer and also set up in the spring stresses which did not depend upon the angular movement of the rotatable element and which rendered the movement of the rotatable element erratic.

The object of my invention is to provide a construction by means of which a control spring which may be mounted and the length of which may be altered without bending or distorting it in any way; may be easily and accurately centered with relation to the rotatable element controlled by it; and in which the free or active portion of the spring is of a definite length and is subjected only to strains due to the rotatable element controlled by the spring.

In carrying out my invention, one end of the spring is secured to the rotatable element to be controlled by it, while the other end is secured to a normally stationary support, the spring and the support being relatively movable to increase or decrease the active length of spring which is free to respond to the movement of the rotatable element, the construction being such that the support may be brought into engagement with any portion of the spring without altering the shape of the spring. When the support is movable to secure the required adjustment it is so mounted that it can be moved along a path which coincides with the curvature of the spring, so that if the control spring is made in the form of a spiral, the adjustable support would be made to be movable in a spiral path of the same form as the spring.

In the preferred construction, the control spring is made in the form of a helix, one end being secured to the rotatable element to be controlled and the other end being accurately and truly mounted upon a cylindrical support which is concentric with the axis of rotation of the rotatable element, the spring preferably being secured to the support by fitting into screw threads of the same pitch as the spring, so that the spring remains of the same size and shape as when made and not distorted or bent in any way for the purpose of securing it to the support. In order that the active portion of the spring may be free and unobstructed in all positions of the rotatable element, the cylindrical support is preferably cut away to form an abutment to which the spring is firmly clamped and which determines the active length of the spring.

My invention will best be understood in connection with the accompanying drawings, which merely for purposes of illustration show some of the various forms in which it may be embodied and in which—

Figure 2:
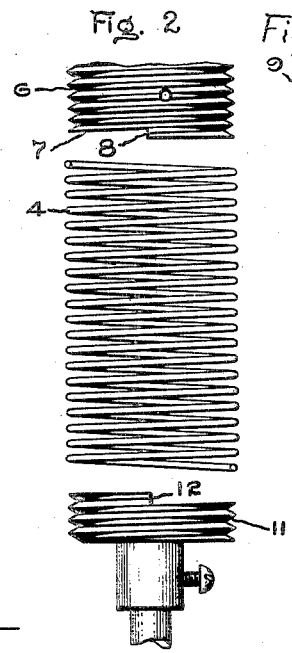
Figure 4:
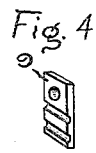
Figure 3:
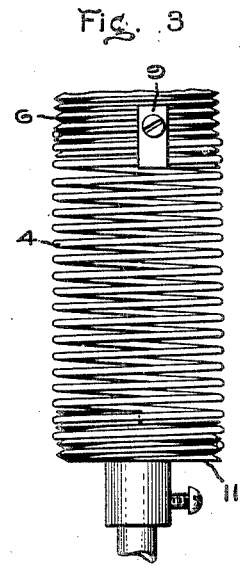

Figure 1 is a view in elevation of a dynamometer provided with a control spring embodying my invention; Fig. 2 is a view showing the control spring and its supporting parts separated from each other; Fig. 3 is a view showing the parts of Fig. 2 when assembled; and Fig. 4 is a perspective view of the retaining clamp.

In the specific embodiment of my invention shown in Figs. 1, 2 and 3 a dynamometer comprising a fixed or stationary coil 1 has a coöperating movable element or coil 2 suspended by means of a flexible cord or suspension 3 so as to be free to oscillate about a vertical axis. The coil is normally in the zero position as shown in Fig. 1, and its angular movement about the vertical axis in response to current flowing through the instrument is controlled by means of a helical control spring 4 having one end secured to the movable element and the other end to a support 5, preferably made in the form of a cylindrical plug, as shown in the drawings, and accurately mounted concentric with and rotatable about the axis of oscillation of the coil 2.

In the operation of the instrument the movable coil is kept in the same position in relation to the fixed coil by rotating the support 5 until the strain exerted through the control spring equals the torque of the moving coil. In order that the torque be measured accurately the relation of the movable coil to the fixed coil must be the same in every angular position of the spring. The control spring 4 is very accurately mounted on the cylindrical support or plug 5 to be truly concentric with the axis of oscillation of the coil 2. In the preferred construction, the accurate centering of the spring upon the cylindrical support or plug 5 is secured by providing the support with threads 6 of the same pitch as the helical spring 4 and of such a depth that although all that part of the spring in engagement with the support is supported by the threads the pitch and diameter of the spring 4 is unchanged. When the spring is screwed upon the plug or support 5 the wire which forms the spring fits snugly into the threads 6 and the spring 4 is thereby automatically and accurately centered upon the plug 5 concentric with the axis of oscillation of the coil 2, and no bending or distorting of the spring is necessary in order to secure to the support, hence when the spring is mounted in accordance with my invention it is in the same condition as when removed from the mandrel on which it was made, and it is not subject to any strain or distortion except what is incident to its use as a control spring. In order that the active length of the spring below the support 5 may be entirely free and unobstructed to respond to the relative angular movement of the support 5 and the movable coil 2 and be unaffected by any other strains, the lower end of the plug 6 is notched as clearly shown in Fig. 2, the notch having one side 7 parallel to the threads 6 and another side perpendicular to the threads to form on the plug an abutment 8 which definitely fixes the length of the free or active portion of the spring 4 and which also permits the active portion of the spring to expand and contract without engaging any portion of the support. The spring is firmly held in its adjusted position by means of a clamp 9 which coöperates with the spring to clamp it firmly into the threads 6 close to the abutment formed by the side 8 of the notch in the support. In case it is desired to alter the length of the spring for purposes of adjustment or calibration, the clamp 9 is loosened and the spring is turned upon the threaded support 5 until the active or free portion of the spring is of the desired length, when the clamp is again fastened and the adjustment is completed. Since the support 5 and spring 4 are of the same diameter the shape of the spring is not changed and the spring is not strained or distorted when its length is altered. Since the weight of the rotatable coil is carried on the flexible suspension 3 that portion of the spring which is below the abutment on the support 5 is entirely free to expand and contract. The active turns of the spring are affected only by relative angular movement of the support 5 and the coil 2 and are free from all other strains. The lower end of the control spring may be secured to the movable coil 2 in any desired way which does not distort the control spring, but in the preferred construction the coil is provided with a cylindrical attaching plug 11 constructed in the same manner as the support 5 and threaded to receive the lower end of the control spring. The attaching plug 11 is also notched to provide an abutment 12 which in conjunction with the abutment 8 on the support 5 determines very accurately the active or free turns of the control spring. Since both the support 5 and attaching plug 11 may be accurately made and mounted truly concentric with the axis of oscillation of the coil 2, comparatively little skill is required to center the control spring 4 and to secure a dynamometer which is reliable in its action and the action of which is more uniform than those heretofore commonly used.

My invention may be embodied in many other forms than that described and shown and I therefore do not limit my invention to the precise arrangement disclosed, but aim in the appended claims to cover all modifications within the spirit and scope of my invention.

What I claim as new and desire to secure by Letters Patent of the United States is:

1. The combination with a rotatable element of a helical control spring having one end secured to said element, and a support threaded into the other end of said spring, said support having at one end a notch with one side parallel to the threads of the support and another side perpendicular to said threads to form an abutment for limiting the active length of the spring.

2. The combination with a helical control spring adapted for rotary motion, of a cylindrical plug mounted concentric with said spring and having screw threads of the proper pitch and depth to hold said spring free from distortion, said plug having at one end a notch with one side parallel to the threads of the plug and another side perpendicular to said threads to provide an abutment for limiting the active length of said spring, and a clamping member mounted on said plug for clamping said spring into said screw threads.

3. The combination with a rotatable element of means for suspending said element to permit it to oscillate about a vertical axis comprising, a helical control spring, a plug secured to said element concentric with the axis of oscillation and threaded into one end of said spring, a supporting plug mounted concentric with the axis of oscillation of said element and threaded into the other end of said helical spring, each of said plugs having a notch with one side parallel to the threads of the respective plugs and another side perpendicular to said threads to form abutments for limiting the active length of the spring, and a clamping member mounted on said supporting plug for clamping said spring into said threads.

In witness whereof, I have hereunto set my hand this 27th day of August, 1909.

ROBERT MILLER, Jr.

Witnesses:
BENJAMIN B. HULL,
MARGARET E. WOOLLEY.